US006549515B1

(12) United States Patent
Sourani et al.

(10) Patent No.: US 6,549,515 B1
(45) Date of Patent: Apr. 15, 2003

(54) METHOD FOR MANAGING VARYING TRAFFIC LOADS IN A TELECOMMUNICATION NETWORK

(75) Inventors: Sason Sourani, Iod Hasharon (IL); Oleg Litvak, Ariel (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/351,339

(22) Filed: Jul. 12, 1999

(30) Foreign Application Priority Data

Jul. 12, 1998 (IL) ........................................ 125310

(51) Int. Cl.[7] ........................................ G01R 31/08

(52) U.S. Cl. ........................ 370/232; 370/235; 370/437

(58) Field of Search ........................ 370/230, 231, 370/232, 233, 234, 235, 352, 355, 356, 360, 395.41, 437, 468, 493, 532, 535, 536, 537, 538, 540, 542, 543, 544, 252, 253; 375/240.01, 240.1, 240.11, 240.23, 240.24, 240.25; 348/14.1, 38, 384.1, 385.1, 388.1, 397.1, 398.1

(56) References Cited

U.S. PATENT DOCUMENTS 5,361,096 A * 11/1994 Ohki et al. .............. 348/386.1
5,506,844 A * 4/1996 Rao ........................... 370/468
5,550,580 A * 8/1996 Zhou ......................... 348/14.1
5,619,197 A * 4/1997 Nakamura ................... 341/50
5,675,384 A 10/1997 Ramamurthy et al.
5,751,722 A * 5/1998 Maekawa ................... 370/522
5,793,425 A * 8/1998 Balakrishnan ......... 375/240.25
5,861,919 A * 1/1999 Perkins et al. ........... 348/385.1
6,012,024 A * 1/2000 Hofmann .................... 704/219
6,148,026 A * 11/2000 Puri et al. ................... 375/240
6,259,733 B1 * 7/2001 Kaye et al. ................. 375/240

FOREIGN PATENT DOCUMENTS

GB 2331430 A 5/1999 ........... H04L/12/56
WO WO 97/48214 12/1997 ........... H04L/12/56

OTHER PUBLICATIONS

Intelstat Earth Station Standards (IESS), Document IESS–501 (Rev.3), Digital Circuit Mulitiplication Equipment Specification, Dec. 4, 1992, pp 27–29.
ITU–T, Digital Circuit Multiplication Equipment Using ADPCM (Recommendation G.726) and Digital Speech Interpolation, G.763 (1/94), pp 1–140.

* cited by examiner

*Primary Examiner*—Douglas Olms
*Assistant Examiner*—Phirin Sam
(74) *Attorney, Agent, or Firm*—Nath & Associates PLLC; Harold L. Novick; Marvin C. Berkowitz

(57) ABSTRACT

In a telecommunication network, a method for managing varying traffic load by establishing an instantaneous demand for bandwidth at a pre-defined location of the telecommunication network. The total number of bits required is compared with a number of bits available for use in that pre-defined location, and a bit rate adjusting mechanism is applied to each one of the algorithms associated with an active channels when required. The bit adjusting mechanism is based on pre-defined functions that describe the number of bits that will be allocated for each active algorithm under varying loads of the network. Thus, the bit adjusting mechanism allow the adjustment of the number of bits for each one the network channels, obeying to the constrain that the total number of bits allocated to all channels shall not exceed the total number of bits available.

10 Claims, 5 Drawing Sheets

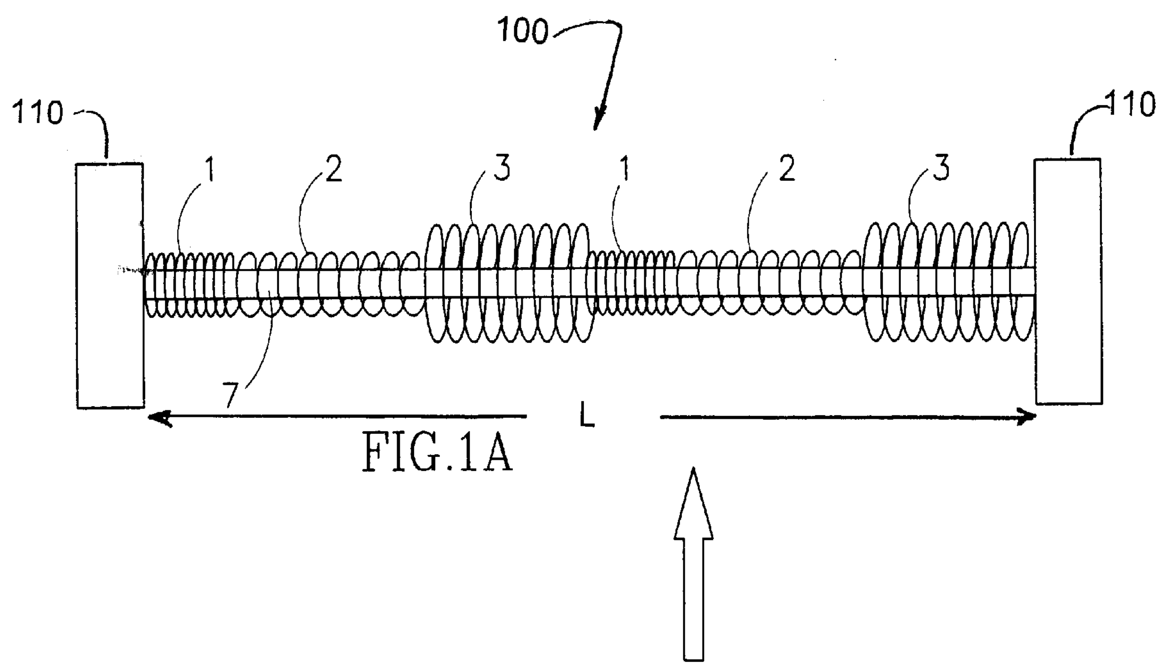
FIG.1A
FIG.1B
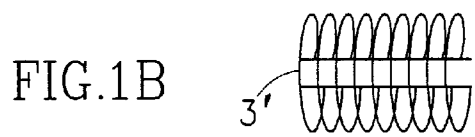
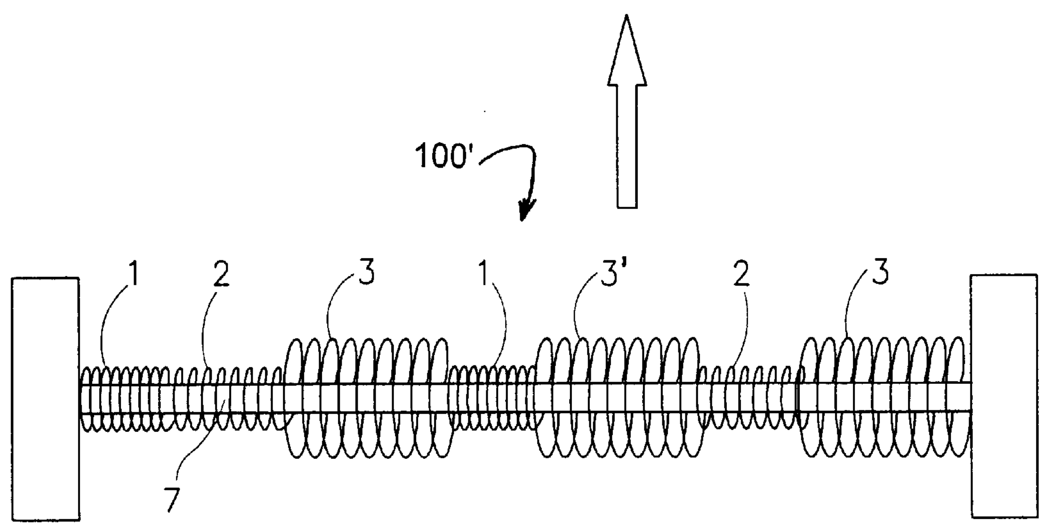
FIG.1C

METHOD FOR MANAGING VARYING TRAFFIC LOADS IN A TELECOMMUNICATION NETWORK

FIELD OF THE INVENTION

The present invention relates in general to telecommunication systems and methods for their management, and in particular to methods of managing networks, operating under varying traffic loads and to telecommunication systems in which varying demands for bandwidth are managed effectively.

BACKGROUND OF THE INVENTION

The ever-growing traffic load in communication networks has been realized for some time as a problem that requires an urgent solution, as the growing traffic loads threatens the collapse these networks. To date, some solutions were suggested to the problem, among which is a solution suggested in IESS-501 (Rev. 3) entitled "Digital Circuit Multiplication Equipment Specification 32 kbit/s ADPCM with DSI and Facsimile Demodulation/Remodulation", 1992. The solution suggested in pp. 27–29 was to decrease the number of bits in the voice channels under overload conditions of the network. When the demand cannot be met by the network, the algorithms will first lose one bit, and then if the demand is still not met, the algorithms may lose a further bit.

Another solution known in the art is a method described in standard G.763 which defines the management of a communication network under varying traffic loads. Essentially, according to this solution a bit is dropped from every algorithm applied in the bearer, and all these dropped bits are collected to a "bank" of bits. When the system load increases, the bits available in the bank can be used. However, if the requirement for bits is further increased and exceeds the number of bits available, each algorithm must "contribute" a further bit to the "bank". The process continues as described above, until the network requirements are met.

As may be appreciated, these solutions are directed to provide a solution to the overload problems and are not particularly concerned with system efficiency. In other words, the prior art solutions are directed towards ensuring that traffic will be transmitted through the network, even if the transmission is not carried out in the best possible mode.

SUMMARY OF THE INVENTION

It is therefore an object of the present invention to provide a method for improving the managing of networks under varying traffic load in synchronous and asynchronous transfer modes, IP networks, IP frame relating networks or any other applicable communication networks.

It is yet another object of the present invention to provide a system and an apparatus capable of managing telecommunication traffic load in accordance with the availability of the system resources.

Other objects of the invention will become apparent as the description of the invention proceeds.

In accordance with the present invention there is provided a method for managing varying traffic load in a telecommunication network, comprising the steps of:

(i) establishing an instantaneous demand for bandwidth at a pre-defined location of the telecommunication network, by calculating a total number of bits, N, required for conveying transmissions by all active channels connected at that pre-defined location of the telecommunication network, wherein the instantaneous demand may arise from more than one type of algorithms, each associated with at least one active channel;

(ii) comparing the total number of bits required, N thus obtained, with a number of bits M available for use in the pre-defined location of the telecommunication network;

(iii) applying a bit rate adjusting mechanism to each one of the algorithms associated with the active channels when the number of bits M available for use in the pre-defined location of the telecommunication network is different from the total number of bits N required by all the active channels; and (iv) repeating steps (i) to (iii) periodically.

The term "telecommunication network" as will be used hereinafter, should be understood to encompass the various types of networks known in the art, such as synchronous and asynchronous transfer networks, IP networks, IP frame relaying networks and the like.

The term "algorithm" as will be used hereinafter, refers to various types of handling transmission. Such types of transmission encompass demodulation/remodulation, native data transmission, various types of compression, silence (0 bit/s), non-compressible clear channel (64 kbit/s) and the like.

In accordance with the present invention, the bit rate adjusting mechanism is applied when M the number of bits available is different from the total number of bits N required. However, as can be appreciated by a man skilled in the art, for practical purposes such a mechanism is applied, when M is substantially different than N. Furthermore, the convergence method applied while implementing the bit adjusting mechanism is likely to result with updating the number of bits to be allocated for each active channel in a way that the overall number of allocated bits will not be exactly equal to M, the number of bits available, but based on practical considerations, be less than but essentially close to M.

By a first embodiment of the present invention, the method provided is carried out according to the following steps:

(i) establishing a network instantaneous demand for bandwidth by calculating N, the total number of bits required for the operative algorithms in all the active channels connected to the telecommunication network, wherein said network instantaneous demand may arise from more than one type of algorithms;

(ii) comparing N, the total number of bits required thus obtained, with the number of bits, M, available for use in the telecommunication network;

(iii) if the number of bits available for use in the telecommunication network M is smaller than the network instantaneous demand N, the bit rate adjusting mechanism is used for dropping bits from one or more of the operative algorithms, whereas if the number of bits available for use in the telecommunication network M is greater than the network instantaneous demand N, the bit rate adjusting mechanism may be used for adding bits to one or more of the operative algorithms; and (iv) repeating steps (i) to (iii) periodically.

According to a preferred embodiment of the invention, the bit rate adjusting mechanism is based on the individual load function of each one of the algorithms applied in the active channels, where the individual load function is defined as the number of bits to be transmitted in the telecommunication network per unit of time, under a given value of load. According to the present invention, the load is determined at a pre-defined location in the telecommunication network. Such a pre-defined location can be for example the bearer, a router, a switch or any other critical point in the network. However, the present invention should also be understood to provide a more comprehensive management by managing loads on a network scale or in a part of such a network. Most preferably, the construction of each algorithm load function is based upon the following (i) assuming that when there is no load at the network (the network load value is practically zero) there are no other algorithms competing with the algorithm for which the load function is being constructed, on the availability of the bearer, and (ii) quantifying the significance of that algorithm in the operation of the specific network (i.e. under what value system load, should bits be dropped from this algorithm when taking into account all types of algorithms that are active in the bearer).

To demonstrate the above, let us assume that a load function is to be constructed for a fax algorithm, In one network the load function may be defined as having a constant value of 15 kbit/s (algorithm with Forward Error Correction, "FEC") as long as the network load does not exceed a certain value, say $v_1$. Thereafter, the value of the load function drops to 9.6 kibts/s (without FEC). In another network, a similar shift in the function value from 15 kbit/s to 9.6 kbit/s might also take place, but under a different value for the system load, $v_2$. The difference between $v_1$ and $v_2$ is derived from the significance given to having this algorithm with FEC as compared with the significance given to the other algorithms active in the network. In one case, the operator would like to retain the FEC feature at the penalty of dropping bits from other algorithms sooner, whereas in the other case the operating might prefer to drop the FEC bits as soon as a demand for bits is raised in the network.

Some typical examples of processes which comprise bits dropping are:

FAX: FEC→NO FEC

ADPCM: 32 kb/s→24 kb/s→16 kb/s

LD-CELP: 16kb/s→12.8 kb/s→9.6 kb/s

CS-ACLEP: 8 kb/s→6.4 kb/s

In accordance with the present invention, the adjusting mechanism is carried out according to the following iterative procedure:

(i) setting a start value for the network load parameter;

(ii) associating the load function with each one of the algorithms to be used in the network;

(iii) calculating an updated requirement for bandwidth (bits) for each one of the algorithms associated with the active channels, based on the current value of load existing in a pre-defined location of the network and the load function of that algorithm corresponding to that current value of load existing in that pre-defined location in the network;

(iv) summing up all the updated requirements for bandwidth in that pre-defined location;

(v) comparing the sum of all the updated requirements for bandwidth with the overall bandwidth available in that predefined location If there is a difference between the two, setting a new value for the system load in accordance with convergence principles that are known in the art per se;

(vi) repeating steps (iii) to (v) until the chosen convergence criterion is met.

As should be realized by a person skilled in the art, step (ii) of the above procedure, namely associating a load function with each one of the algorithms to be used in the network, is preferably carried out at the initial configuration of the network, and should not be followed every time the above procedure is carried.

According to yet another embodiment of the invention, the method provided allows the user to further manage the varying traffic load by replacing one algorithm with another, depending on the existing load condition. For example, the load function for ADPCM algorithm may be pre-defined so that upon reaching a certain value of load, this algorithm will be replaced with another algorithm, for example such as LD-CELP.

According to still another aspect of the present invention there is provided an apparatus operative in a telecommunication network, which is capable of managing a varying traffic load, and comprising: a processor for calculating the network local load and determining the allocation of available network resources in accordance with the method provided by the present invention, and a bit allocating/deallocating device.

In accordance with another aspect of the invention there is provided a system for managing varying traffic load in a telecommunication network, comprising at a first of its ends a processor for calculating the network load, a plurality of channels each comprising a receiver and a transmitter, a bit-allocating device and a bearer connecting the first end of the system with a second end thereof. At its second end, the system comprises a bit-deallocating device, a plurality of channels each comprising a receiver and a transmitter and optionally a processor for calculating the network load. In accordance with this embodiment the information arrives from a trunk, typically in an uncompressed state, to the channels connected thereto. Each of the channels transmits the information received, preferably after processing it e.g. by compressing the information, to a bit-allocating device. Also each of the channels transmits to the processor calculating the network load information to allow identification of the algorithm which is currently in use in that particular channel. The latter information allows the processor to determine the instantaneous expected load in the bearer. The bits are arranged in the bit-allocating device according to a pre-defined convention, e.g. from the channel identified with the lowest number to the one nearing the highest identifying number, and are carried forward along the bearer to a second end of the system. At the second end of the system, the information is received at a bit-deallocating device and transmitted therefrom to a plurality of channels connected to that bit-deallocating device. If required, the information thus received, may be further processed (e.g. decompressing a compressed transmission), and transmitted to the trunks connected with each one of these channels. In order to properly distribute the information to the various channels, the system should be provided at its second end with the information regarding the instantaneous value of the load functions applied for the various algorithms, as well as with the information regarding which algorithm is used by each one of the channels. This information may be comprised in the information transmitted in the bearer, but preferably, the system will further comprise at its second end a processor for independently calculating the system load based on the number of channels using each of the algorithms. The advantage of having such a further processor is in eliminating the need to dedicate part of the space available for transmission, to information that can be generated locally, as well as to reduce possible problems occurring due to transmission errors during the retrieval of the transmitted information.

BRIEF DESCRIPTION OF THE DRAWINGS

FIG. 1A presents a model of a telecommunication network in the form of a chain of different springs occupying a rod;

FIG. 1B illustrates the insertion of a further spring into the chain of springs shown in FIG. 1A;

FIG. 1C presents the resulting chain of springs after the insertion of the spring shown in FIG. 1B;

DETAILED DESCRIPTION OF THE INVENTION

Figure 2:
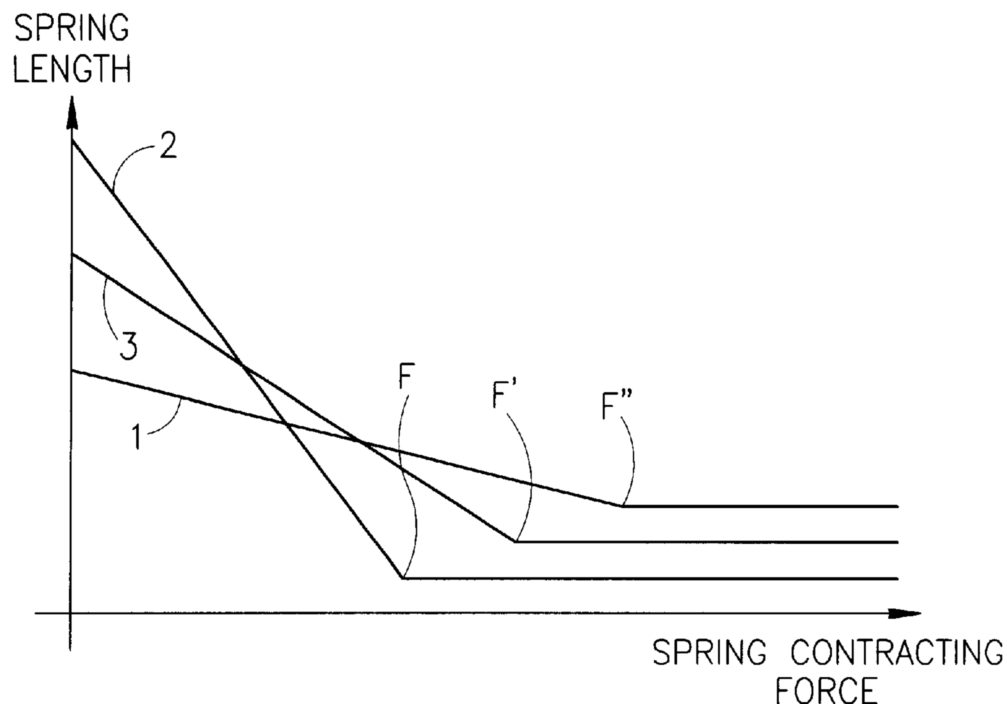
FIG. 2 illustrates exemplary length functions of the springs.

In the modern communication traffic network, a large number of communication channels may simultaneously occupy the full bandwidth available. Examples of such applications may be found in concurrent transmissions of voice channel(s) with or without compression, fax(s), data or any combination thereof.

As was previously explained, a major problem existing in traffic networks is when the network load exceeds or even approaches the maximum capacity of the bandwidth available. To overcome this problem, the present invention provides a method for adapting the requirements from the network with bandwidth available resources. Such adaptation is made by determining a load function for each one of the algorithms in compliance with the designing requirements of the network. The load function allows to define if and how to modify the demand for bits of each of the algorithms when the network traffic load increases, e.g. Digital Speech Interpolation ("DSI") algorithms, Variable Bit Rate ("VBR") algorithms, auto-forward Error Correction ("FEC") algorithms, signaling algorithms, data processing algorithms, and others. For example, under low load fax transmissions FEC may add to the fax transmissions, whereas when the network traffic load increases, FEC bits will not be used. Several practical examples of implementing the present invention are described in "The Springs Technology, a Springboard to the Convergence of Toll Quality Telephony and Data" by Sason Sourani, presented an ECI Telecom Annual Technical & Planning Symposium, Toronto, Canada Jul. 12–Jul. 16, 1999, and is incorporated hereby as annex A.

In order to achieve an efficient management of the traffic load, the present invention provides a method where each of the algorithms is not managed separately, but rather to manage all the algorithms that are active, simultaneously.

For better understanding of the invention, a simple model of illustrating the present invention, namely by considering a series of concatenated springs, is presented in FIG. 1A. In this model illustrated in this FIG. 1A, there is shown a chain 100 comprising two each of three different types of springs, springs 1, springs 2, and springs 3, and are distinguished from each other by their respective spring characterized constant. The spring 1, 2, 3 shown in FIG. 1A occupy a full length L of rod 7 between restraints 110. At the initial stage, no force is applied on the springs 1, 2, 3, and each one of them occupies a portion of the total length L of rod 7 that corresponds to its respective initial length. In FIG. 1B there is shown an additional spring 3' of the same type as spring 3, that is to be inserted into the springs' chain 100 illustrated in FIG. 1A. Since the initial six springs already occupy the full possible length L of the chain 100, and since rod 7 cannot be extended, inserting an additional spring 3' must have an impact upon all seven springs, causing each one of them to contract in accordance with their respective characterizing constant, making room for the additional spring 3' to be inserted. FIG. 1C illustrates the chain 100' of contracted springs after inserting the additional spring 3'. Obviously, the physical parameter dominating such a process of inserting the additional spring 3' is the force acting on each one of the springs 1, 2, 3, 3'. Furthermore, in order to comply with Newton's laws, once the system reaches a steady state condition, the force acting on each one of the springs must be retained, and thus equal force acts on all springs. To further elaborate on the above described model, the corresponding mathematical description of the model is described herein.

Let us assume that the length of the rod occupied by the chain of springs is designated by "L".

The length of spring of the type 1 will therefore be:

$$l_1(f)=l_{01}-k_1*f;$$

Similarly, the lengths of springs of the type 2 and 3 will be:

$$l_2(f)=l_{02}-k_2*f; \text{ and}$$

$$l_3(f)=l_{03}-k_3*f$$

respectively.

$l_{0i}$ is the initial length of spring i when no force is applied thereon, and may of course be different for each one of the springs. f is the contracting force and $k_1$, $k_2$ and $k_3$ are the spring constants of springs 1, 2 and 3, respectively.

FIG. 2 presents some typical spring functions, where the lengths of the springs of the types 1, 2 and 3 are presented as a function of the force f applied thereon. As may be noted from FIG. 2, the particular spring type 2 has the highest length when no force is applied, whereas the spring of type 1 has the lowest value under this condition. However, due to the springs' characteristics, a spring of the type 2 will contract very rapidly when subjected to the action of force, while a spring of type 1 will contract relatively slowly. Increasing the force applied on each of the springs results in the decrease of their length until each one of them resumes its finite length (not necessarily under the same force). When the finite length of each of the springs (shown in FIG. 2 as f, f' and f") are reached, a further increase in the force applied, will not have an effect in contracting the spring any further.

From the above explanation it also should be realized that if further are to be inserted into the chain, springs of the type 2 will be the first of the three types to reach their finite value, while the springs of the types 1 and 3 will reach their finite value only later, if still subjected to increasing force. Naturally, when all springs reach their finite lengths, no further springs could be inserted into the chain.

Reverting now to FIG. 1*a*, we get that $$2*l_1(f^0)+2*l_2(f^0)+2*l_3(f^0)=L$$

After inserting the additional spring (FIG. 1*c*), the situation may be described by using the following formula:

$$2*l_1(f^1)+2*l_2(f^1)+3*l_3(f^1)=L$$

Since the order by which each one of the springs occupy the rod and the length function associated with each spring are known, we can determine at any given moment where is the exact location of each of the springs and what is the force applied on them. Moreover, even if we change the rod length L, we can still determine the location and length of each spring.

The general formula describing such a case is:

$$L = \sum_{i=1 \text{ to } T} n_i l_i(f) \tag{I}$$

where:

T is the number of different types of springs used;

$n_i$ is the number of springs of the type i;

$l_i$ (f) is the length function of a spring of the type I;

f is the overall force applied; and

L is the rod length.

All the parameters in equation (I) are known, except the overall force f. Therefore, the solution to be applied is of an equation having one unknown. The location of the $j^{th}$ element may be calculated according to equation (II):

$$L = \sum_{i=1 \text{ to } T} n_i^{(j)} l_i(f) \tag{II}$$

where:

T is the number of different types of springs used;

$n_i^{(j)}$ is the number of springs of the type i having an ordinal number smaller than j;

$l_i$(f) is the length function of a spring of the type i;

f is the overall force applied; and

L is the rod length.

In other words, Eq. (II) provides a way to determine the exact new location of spring j in the system. The calculating procedure will therefore be to calculate the new force acting upon of the system, and then the impact of that new force on the j-1 springs giving the new length of each one of these springs that corresponds the new force. Summing up the new lengths of the j-1 springs, provide the position of the start point of spring j.

Revering now to the telecommunication world, the rod length, L in the springs analogy will be replaced by the bandwidth, B, "$l_i$(f)", being the length of spring of type "i" when the spring is subjected to the applied force "f", will be replaced by "$b_i$(p)", the bandwidth of algorithm "i" when the load value is "p".

The new equation describing the load developing in the telecommunication network is:

$$B = \sum_{i=1 \text{ to } T} n_i b_i(p) \tag{III}$$

In solving this equation, any value of p that satisfies the condition that the overall bandwidth required is smaller or equal to B, the available bandwidth, may be used. However, according to a preferred embodiment of the present invention, the lowest value of p that satisfies Eq. (IV) should be used:

$$B \geq \sum_{i=1 \text{ to } T} n_i b_i(p) \tag{IV}$$

Various iteration procedures may be adopted to find p, as known in the art per se. For example, linear iterative procedure may be followed. In this procedure, the program substitutes ascending values for p, starting from 0 until finding the first value of p that satisfies Eq. (IV). Alternatively, the iterative procedure may be a logarithmic procedure, using successive approximation algorithm that is well known in the art.

Figure 3:
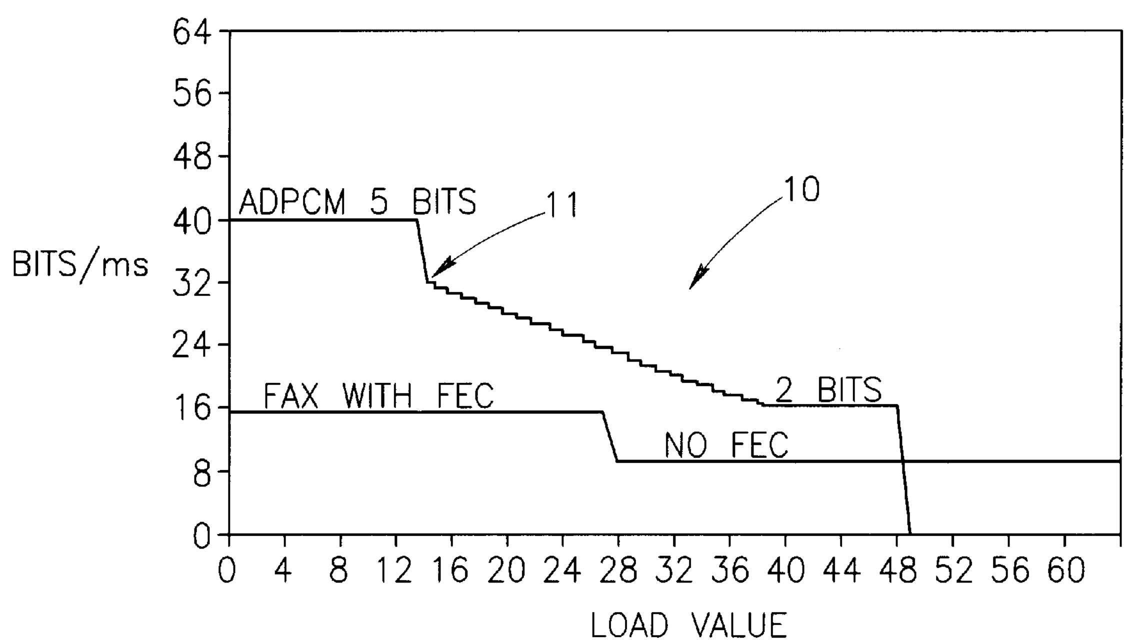
FIG. 3 presents an example of a non-linear load function.

Examples of such load functions are presented in FIG. 3. As may be noted, there is one major difference between the length function of springs, as illustrated in FIG. 2 and the load functions as illustrated in FIG. 3. The latter are essentially a non-linear function, and hence the analytical solution that can be applied to solve the spring model, cannot be implemented in the present case and instead an iterative approach should be considered. One important characteristic of all load functions, is, that they can all be characterized as descending monotonous functions (or at least never get higher values when the traffic load is increased). This fact may serve as a basis for iterative solutions as will be demonstrated in some examples below:

FIG. 3 illustrates an example of a non-linear load function comprising 5 bits/sample @ 8 kHz for the ADPCM G.7.26 algorithm. At higher loads of the system, in the example illustrated when the load value is equal to 15 (11) the rate is gradually decrease (10) until 2 bits/sample @ 8 kHz of G.726 are transmitted (load value is equal to 48). Curve 10 is shown in FIG. 3 as a straight line. Practically, the gradual decrease of the rate is done in discrete increments, the average of which is presented by curve 10. Increasing the system load further, may result in dropping further bits to 0 bits/sample @ 8 kHz, as may be seen in FIG. 3. The FAX load function as illustrated in FIG. 3, is represented as a step function, dropping from FEC to NO FEC at a point when the ADPCM has a value of about 3.5 bits/sample @ 8 kHz. Similarly, the flexibility provided by the present invention in managing the increase in the network traffic load is achieved by properly selecting the load function to allow the following:

delay/early data transmission;

omitting/adding VBR in voice transmission;

omitting/adding FEC in facsimile transmission;

switching between voice transmission algorithms;

switching between VBD algorithms;

omitting/adding VBR on VBD;

and the like.

Let us now consider an example in which the network comprises a large number of algorithms which all obey the load functions described above and no other types of algorithms are present. In such a case, the process of increasing the network load, which is also illustrated in FIG. 4 may be described as follows:

(i) At the initial stage ($t_0$) unused bits are available, and therefore the load value of the network is equal to 0.

Figure 4:
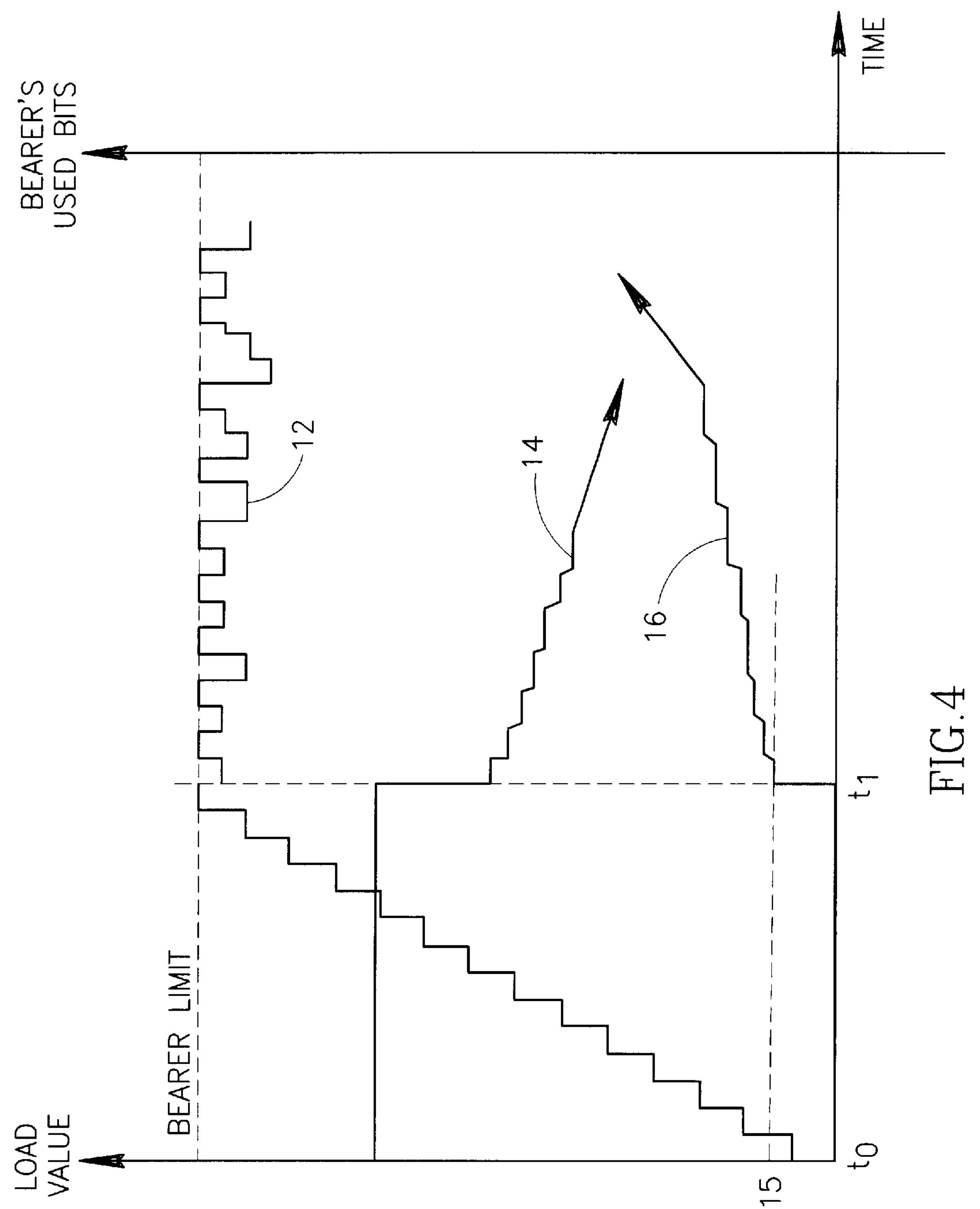
FIG. 4 illustrates an example of variations in the load value and its effect upon VBR and used bits.

(ii) As traffic increases, as shown by curve 12 of FIG. 4, the initially unused bits are consumed until no unused bits are available ($t_1$). At this stage, the load value of the network, shown by curve 16 in FIG. 4 is still equals to 0.

(iii) Upon further increase in the traffic, the load value also increases as the network "attempts" to respond to the new demands. Since according to the example taken, there is no effect of the bits availability when the load value is less than 15, therefore to comply with the new demands, a new load value is taken and is equal to 15. Similarly, the transmission rate shown as curve 14 in this Fig. drops from 40 kb/s to 32 kb/s. This curve 14 demonstrates transmission rate using the ADPCM algorithm for the load value developing, where this rate is derived from the load function illustrated in FIG. 3. Naturally, the values shown in this example serve only for illustration purposes, and any other choices may be taken.

(iv) The optimization of the overall bit rates for the algorithms involved, is done by optimizing the number of bits so as to get the highest number of bits available for each algorithm while using as a constrain that total number of bits of all the algorithms is equal or smaller than the available bandwidth. A gradual decrease in the bit rate, from 32 kb/s towards 16 kb/s, is achieved when the load value increases from 15 to higher value, as presented in FIG. 4.

In order to further illustrate the invention, let us consider the following non-limiting examples. In a particular case where we deal with a voice algorithm and let us assume that we use the ADPCM algorithm with 32 bits/ms. This is exactly the nominal value needed for ADPCM, namely, 4 bits/sample. As the load increases, the number of available bits might be reduced to 31 bits/ms and than to 30 bits/ms and so on. In such a case, and assuming a DCME frame of 8 PCM frames, the algorithm sampling procedure may be as follows:

when the rate is 32 bits/ms: 4,4,4,4,4,4,4,4 with mean value of 4.000 bits.

when the rate is 31 bits/ms: 4,4,4,4,4,4,4,3 with mean value of 3.875 bits.

when the rate is 30 bits/ms: 4,4,4,3,4,4,4,3 with mean value of 3.750 bits.

when the rate is 29 bits/ms: 4,4,4,3,4,3,4,3 with mean value of 3.625 bits.

when the rate is 28 bits/ms: 4,3,4,3,4,3,4,3 with mean value of 3.500 bits.

when the rate is 27 bits/ms: 4,3,4,3,4,3,3,3 with mean value of 3.375 bits.

when the rate is 26 bits/ms: 4,3,3,3,4,3,3,3 with mean value of 3.250 bits.

when the rate is 25 bits/ms: 4,3,3,3,3,3,3,3 with mean value of 3.125 bits.

when the rate is 24 bits/ms: 3,3,3,3,3,3,3,3 with mean value of 3.000 bits.

In the above cases, one may achieve any practically required VBR value with accuracy of 0.125 bit. Due to the dynamic load, the actual VBR obtainable, may have a much better accuracy. Similarly, this concept may be applied used all the way from 5 bits to 2 bits.

According to another preferred embodiment of the invention, Forward Error Correction ("FEC") Codes may be partially implemented. As known in the art, there are various networks in which the use of FEC Codes is dropped only due to the forecast that these networks are likely to operate under excessive load. However, the present invention allows to operate such networks in a way that when the load is reduced, the FEC Codes will be implemented, and only at times when the load increases above a pre-defined threshold, the use of these codes will be dropped. Consequently, the overall performance of a network operating in accordance with this embodiment of the invention is improved when compared with a network where FEC Codes are not implemented at all, as explained above.

Another example of the use of the method of the present invention is the following: Let us consider a case where two algorithms are used. In this example both algorithms are characterized as having a non-continuous load function under the same load value (4), and the problem arising how will it be decided which of the algorithm will be the first one to lose bits. One simple solution to the problem, is, to avoid such a situation. In order to do so, the design of the load functions for all the algorithms should ensure that a situation where two or more of the algorithms lose bits at the very same load, does not occur. A simple way of doing that is by deciding arbitrary that one of the algorithm will lose bits at load say $v_1$, whereas the other, at for example $v_1+1$.

Figure 5A:
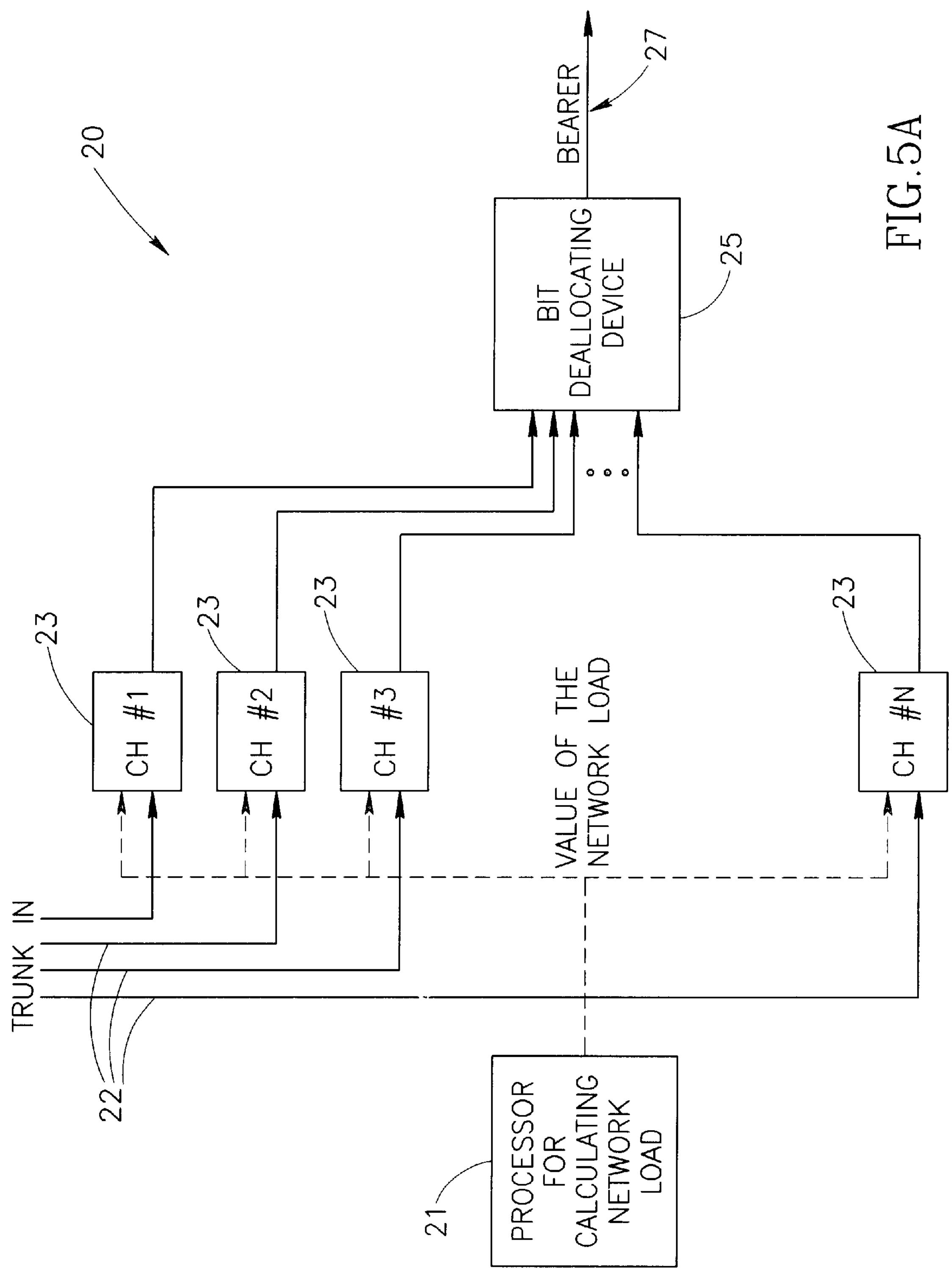
FIGS. 5A and 5B illustrate a block diagram of system according to the present invention, for the management of varying traffic load.
Figure 5B:
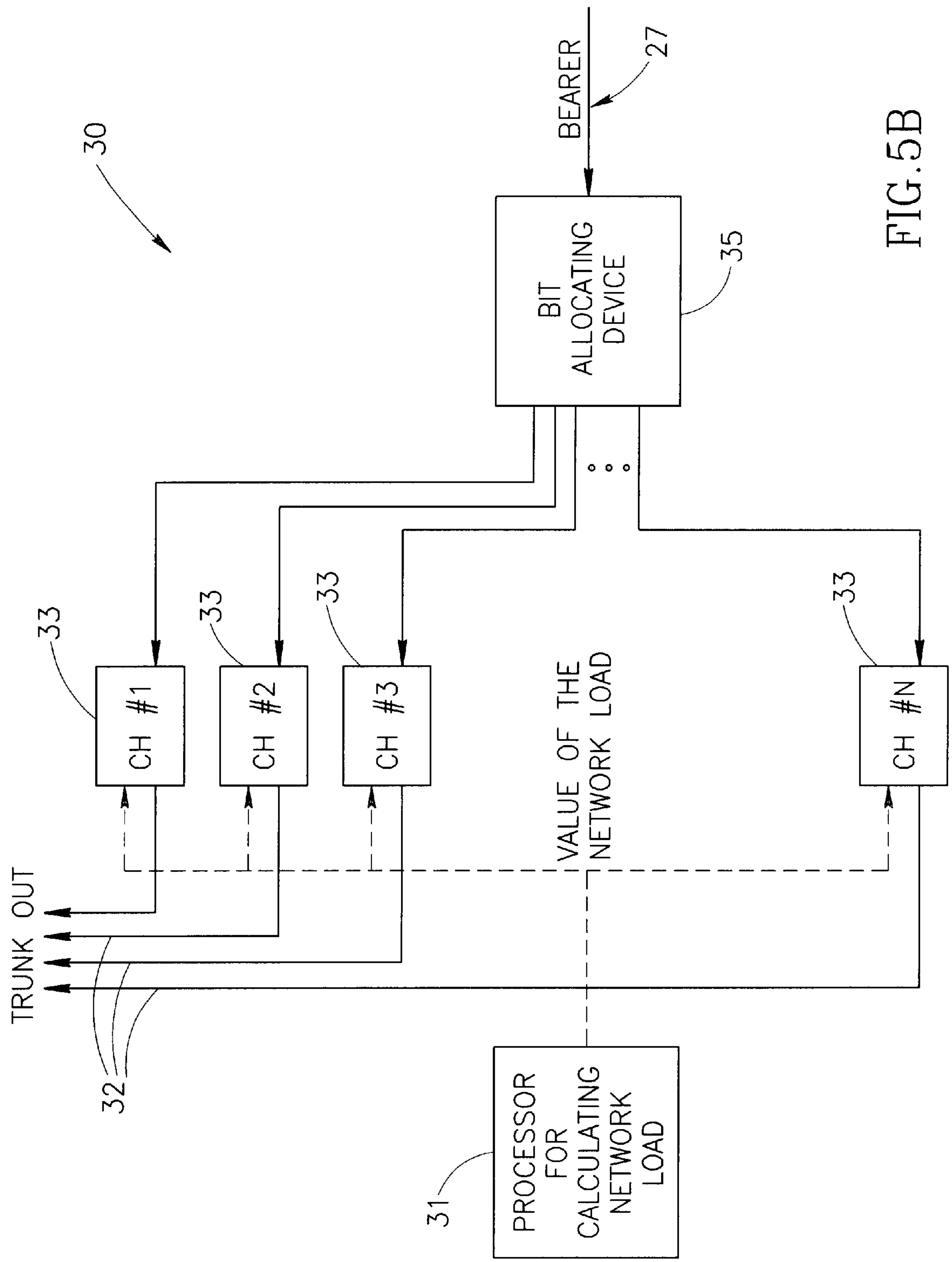

An example of a system for managing varying traffic load in a bearer of a telecommunication network, is illustrated in FIGS. 5A and 5B. As may be seen in the block diagrams presented in FIGS. 5, the system comprises at a first one of its ends, 20, a processor 21 for calculating the network load, a plurality of channels 23 each comprising each a receiver and a transmitter (not shown in the Fig.), a bit-allocating device 25 and a bearer 27. At its second end, the system comprises a bit-deallocating device 35, a plurality of channels 33 comprising each a receiver and a transmitter (not shown in the Fig.) and optionally a processor 31 for calculating the network load. The information received from trunk 22 may be processed and is carried by channels 23, to a bit-allocating device 25. Also each of the channels 23 transmits to the processor for calculating the network load 21, which algorithm is currently in use in that particular channel. The latter information allows processor 21 to determine the instantaneous expected load in bearer 27. The bits are arranged in the bit-allocating device 25 according to a pre-defined convention, and are carried forward in the bearer 27 to a second end of the system 30. At the second end of the system 30, the information carried by the bearer is received at a bit-deallocating device 35, from which it is transmitted to a plurality of channels 33 connected therewith. The information thus received, being preferably in a processed state (e.g. compressed), is de-processed and transmitted to trunks 32 connected to channels 33. In order to properly distribute the information to the various channels, the system should be provided at its second end 30 with the information regarding the instantaneous value of the load functions applied for the various algorithms, as well as with the information regarding which channel uses what algorithm. This information may for example be comprised in the information transmitted in the bearer, but preferably, the system will further comprise also at its second end 30, a processor for calculating the system load 31 based on the number of channels using each of the algorithms. The advantage of having such a further processor, as was previously explained, is in eliminating the need the dedicate part of the space available for transmission, to information that can be generated locally, as well as to reduce possible problems occurring due to transmission.

It is to be understood that the above description is only of some embodiments of the invention and serves for its illustration. Numerous other ways of managing load developing in a telecommunication networks may be devised by a person skilled in the art without departing from the scope of the invention, and are thus encompassed by the present invention.

What is claimed is:

1. A method for managing varying traffic load in a telecommunication network, comprising the steps of:

(i) establishing an instantaneous demand for bandwidth at a pre-defined location of said telecommunication network, by calculating a total number of bits, N, required for delivering transmission by all active channels connected at said pre-defined location of said telecommunication network, wherein said instantaneous demand may arise from more than one type of algorithms, each associated with at least one active channel;

(ii) comparing the total number of bits required N thus obtained, with a number of bits M available for use in said pre-defined location of the telecommunication network;

(iii) applying a bit rate adjusting mechanism to each one of the algorithms associated with the active channels when the number of bits M available for use in said pre-defined location of said telecommunication network is different from the total number of bits N required by all said active channels; and (iv) repeating steps (i) to (iii) periodically; wherein step (iii) is carried out by using the bit rate adjusting mechanism for dropping bits from one or more of the operative algorithms when the number of bits M available for use in the telecommunication network is smaller than the number of bits N representing the network instantaneous demand, and for adding bits to one or more of the operative algorithms if the number of available bits M is greater than the number of bits N representing the network instantaneous demand.

2. A method according to claim 1, wherein the bit rate adjusting mechanism is operative for updating the allocation of bits for the operative algorithms in the active channels in accordance with pre-defined functions, setting an updated requirement for bits for each of said algorithms, in accordance with the load existing in a pre-defined location in the network.

3. A method for managing varying traffic load in a telecommunication network, comprising the steps of:

(a) establishing an instantaneous demand for bandwidth at a pre-defined location of said telecommunication network, by calculating a total number of bits, N, required for delivering transmission by all active channels connected at said pre-defined location of said telecommunication network, wherein said instantaneous demand may arise from more than one type of algorithms, each associated with at least one active channel;

(b) comparing the total number of bits required N thus obtained, with a number of bits M available for use in said pre-defined location of the telecommunication network;

(c) applying a bit rate adjusting mechanism to each one of the algorithms associated with the active channels when the number of bits M available for use in said pre-defined location of said telecommunication network is different from the total number of bits N required by all said active channels; and (d) repeating steps (a) to (c) periodically;

wherein said method is carried out according to the following iterative process:

(i) setting a start value for a network load parameter;

(ii) associating a load function with each one of the algorithms to be used in the network;

(iii) calculating an updated requirement for bandwidth for each one of said algorithms based on the current value of load existing in said pre-defined location in the network and the load function of that algorithm which corresponds to that current value of load existing in said pre-defined location in the network;

(iv) summing up all the updated requirements for bandwidth in said pre-defined location in the network;

(v) comparing the sum of all said updated requirements for bandwidth with the bandwidth available;

(vi) if said requirements for bandwidth are substantially different than the bandwidth available, setting a new value for the system load in accordance with convergence principles; and (vii) repeating steps (iii) to (vi).

4. A method according to claim 3, wherein said predefined location is the network bearer.

5. A method according to claim 3, wherein said pre-defined location is a telecommunication switch.

6. A method according to claim 3, wherein said pre-defined location is a telecommunication router.

7. A method for managing varying traffic load in a telecommunication network, comprising the steps of:

(a) establishing an instantaneous demand for bandwidth at a pre-defined location of said telecommunication network, by calculating a total number of bits, N, required for delivering transmission by all active channels connected at said pre-defined location of said telecommunication network, wherein said instantaneous demand may arise from more than one type of algorithms, each associated with at least one active channel;

(b) comparing the total number of bits required N thus obtained, with a number of bits M available for use in said pre-defined location of the telecommunication network;

(c) applying a bit rate adjusting mechanism to each one of the algorithms associated with the active channels when the number of bits M available for use in said pre-defined location of said telecommunication network is different from the total number of bits N required by all said active channels; and (d) repeating steps (a) to (c) periodically;

wherein said at least one of the algorithms is selected from the group consisting of: ADPCM, CS-ACELP, LD-CELP and FEC/no FEC.

8. An apparatus operative in a telecommunication network, capable of managing a varying traffic load and comprising:

a processor for calculating the network local load and determining the allocation of available network resources by the steps of:

(i) establishing an instantaneous demand for bandwidth at a pre-defined location of said telecommunication network, by calculating a total number of bits, N, required for delivering transmission by all active channels connected at said pre-defined location of said telecommunication network, wherein said instantaneous demand arises from at least two different algorithms, each associated with at least one active channel;

(ii) comparing the total number of bits required N thus obtained, with a number of bits M available for use in said pre-defined location of the telecommunication network;

(iii) applying a bit rate adjusting mechanism to each one of the algorithms associated with the active channels when the number of bits M available for use in said pre-defined location of said telecommunication network is different from the total number of bits N required by all said active channels; and (iv) repeating steps (i) to (iii) periodically; and a bit allocating/de-allocating device.

9. A method for managing varying traffic load in a telecommunication network, comprising the steps of:

(i) establishing an instantaneous demand for bandwidth at a pre-defined location of said telecommunication network, by calculating a total number of bits, N, required for delivering transmission by all active channels connected at said pre-defined location of said telecommunication network, wherein said instantaneous demand arises from at least two different algorithms, each associated with at least one active channel;

(ii) comparing the total number of bits required N thus obtained, with a number of bits M available for use in said pre-defined location of the telecommunication network;

(iii) applying a bit rate adjusting mechanism to each one of the algorithms associated with the active channels when the number of bits M available for use in said pre-defined location of said telecommunication network is different from the total number of bits N required by all said active channels; and (iv) repeating steps (i) to (iii) periodically.

10. A method according to claim 9, wherein said bit rate adjusting mechanism comprises replacing of at least one algorithm associated with at least one active channel with another suitable algorithm, in accordance with a pre-defined load function of said at least one algorithm.

* * * * *